Oct. 1, 1963          G. D. LARSON          3,105,702
AUTOMOBILE PASSENGER SAFETY RETAINER
Filed Feb. 27, 1962          2 Sheets-Sheet 1
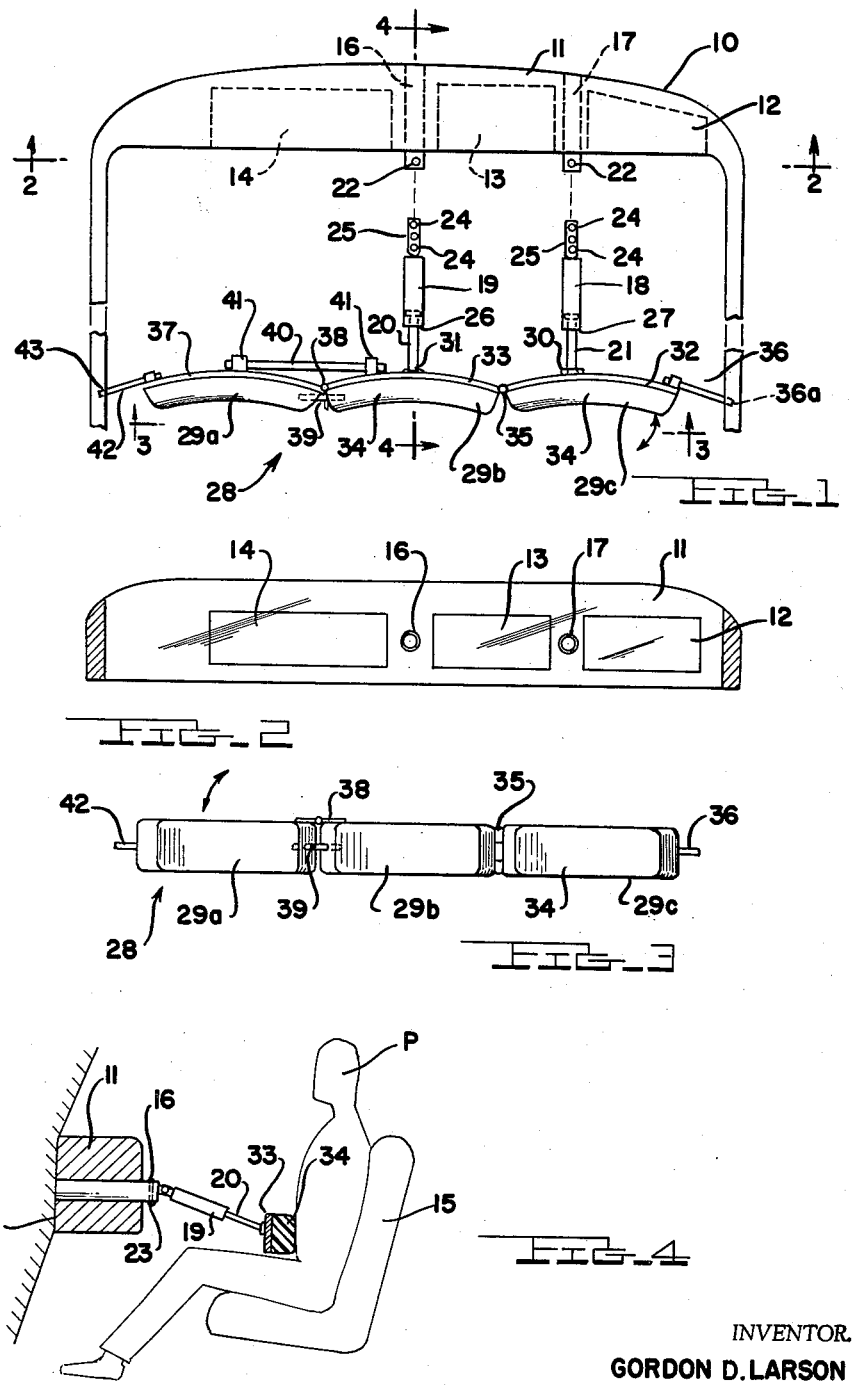
INVENTOR.
GORDON D. LARSON
BY *Cullen & Canton*
ATTORNEYS Oct. 1, 1963    G. D. LARSON    3,105,702
AUTOMOBILE PASSENGER SAFETY RETAINER
Filed Feb. 27, 1962    2 Sheets-Sheet 2
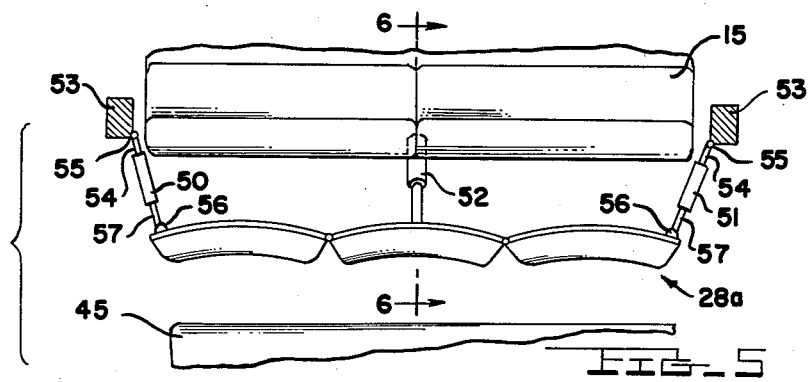
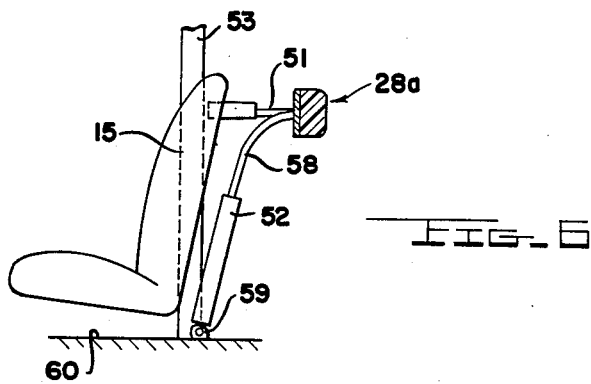
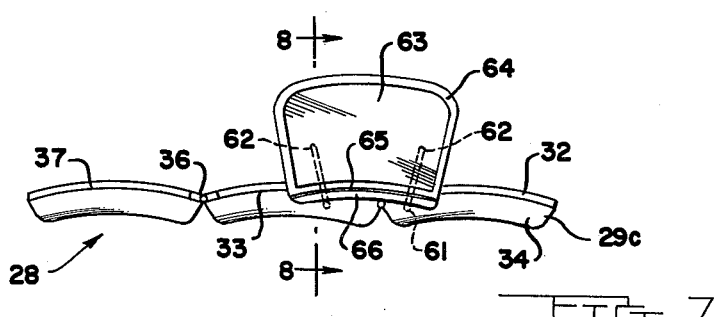
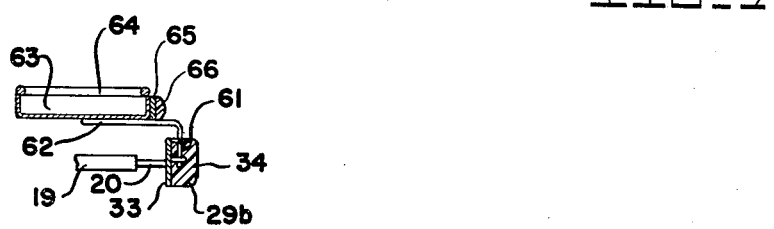
INVENTOR.
GORDON D. LARSON
BY Cullen & Cantor
ATTORNEYS

United States Patent Office

3,105,702
Patented Oct. 1, 1963

3,105,702
AUTOMOBILE PASSENGER SAFETY RETAINER
Gordon D. Larson, Alba, Mich.
Filed Feb. 27, 1962, Ser. No. 175,981
3 Claims. (Cl. 280—150)

This invention relates to an automobile passenger safety retainer and more particularly, to a means for holding a passenger upon the automobile seat and absorbing heavy forces in the event of an accident.

Safety belts are commonly used to hold a passenger upon the seat of an automobile in the event of an accident. Conventional safety belts tend to concentrate loads upon a small area of the human body because of their flexibility, thereby subjecting the user to injuries due to the belt itself. In addition, there is a resistance on the part of the passengers to use safety belts.

Hence, it is an object of this invention to form an automobile passenger safety retainer in the form of a wide bar which extends forwardly of but spaced from the seat and which is normally ready for use at all times to restrain the passenger within the seat in the event of an accident and which is so made as to distribute loads over a considerable portion of the passenger's body and at the same time to absorb loads, through shock absorbers, which otherwise might be absorbed by the human body.

A further object of this invention is to form such a safety retainer of interconnected sections which may be easily moved aside for entrance and exit from the automobile but which when arranged in normal use position, is available at all times to restrain the passenger and yet permit him a substantial freedom of motion upon the seat of the automobile as contrasted with the use of seat belts wherein the passenger is restrained in one position upon the seat.

These and other objects and advantages of this invention will become apparent upon reading the following description, of which the attached drawings form a part.

In these drawings:

FIG. 1 is a plan view of a portion of an automobile, shown schematically, and the safety retainer bar, but with the retainer disconnected from and spaced rearwardly of the automobile dashboard.

FIG. 2 is an elevational, schematic view of the dashboard of the automobile taken in the direction of arrows 2—2 of FIG. 1.

FIG. 3 is an elevational view of the safety retainer taken in the direction of arrows 3—3 of FIG. 1.

FIG. 4 is a cross-sectional side view taken in the direction of arrows 4—4 of FIG. 1 and showing, schematically, the passenger and automobile seat.

FIG. 5 is a view of the safety retainer mounted for use with the rear passenger seat of the automobile, and FIG. 6 is a cross-sectional view taken in the direction of arrows 6—6 of FIG. 5.

FIG. 7 is a top, plan view of a utility tray mounted upon the retainer.

FIG. 8 is a cross-sectional view taken in the direction of arrows 8—8 of FIG. 7.

*Front Retainer—FIGS. 1–4*

The retainer herein is adaptable for use with an automobile, shown schematically, having a conventional front or fire wall 10 and a dashboard 11, provided with a conventional glove compartment 12, radio compartment 13 and instrument cluster 14. The front seat 15 is shown schematically in FIG. 4.

Retainer mounting sockets 16 and 17, in the form of tubes, extend through the dashboard and abut against or are connected to the fire wall 10 or some other rigid portion of the body of the automobile. The sockets open rearwardly, that is, toward the front seat. To these sockets are connected a pair of shock absorbers 18 and 19, having cylinders containing pistons to which piston rods 20 and 21 are connected. The shock absorbers may be of any conventional type, such as conventional spring type shock absorbers or hydraulic shock absorbers which have their piston rods normally extending outwardly of the cylinders the maximum distance and retract into the cylinders under applied loads against the resistance of the force-absorbing means within the cylinders.

The sockets 16 and 17 are each provided with openings 22 through which latch pins 23 (see FIG. 4) are inserted to engage with one of a number of holes 24 formed in extensions 25 which are pivotally connected to and extend forwardly of the shock absorbers to thereby adjustably mount the shock absorbers to the sockets with the shock absorbers sloping downwardly (see FIG. 4). By releasing the latch pins 23, the cylinders may be telescoped into their sockets 16 and 17 and held by engaging the latch pins with the forward edges 26 and 27, respectively, of the cylinders. The shock absorbers are thus retracted into the dashboard, within the sockets, for non-use or storage.

The retainer herein is in the form of a bar 28 which extends substantially the full width of the seat 15 and is normally spaced a predetermined distance forwardly of the seat 15. The bar is formed of three substantially identical sections, namely, driver support section 29a and center and end passenger support sections 29b and 29c. The sections are each curved concavely relative to the seat. Piston rod 21 is releasably connected by a detachable latch or bracket 30 to a rigid, curved pad bar 32 of end section 29c, and piston rod 20 is non-releasably connected at 31 to a similar pad bar 33 of center section 29b. The two pad bars are each covered with a thick heavy padding 34 so that the sections are heavily padded and are of a substantial vertical height to cover a substantial part of the middle section of the passenger P as shown in FIG. 4.

Sections 29b and 29c are hinged together by vertically axised hinge 35 so that the end section swings horizontally relative to the center section, as indicated by the double arrow in FIG. 1.

A sliding latch bolt 36 is connected to the free end of section 29c for engaging with a socket or keeper 36a formed in the automobile right hand door or arm rest.

The driver section 29a is formed with a rigid pad bar 37 connected by horizontally axised hinge 38 to center section 29b so that it swings upwardly relative to the center section as indicated by the double arrow in FIG. 3. In use, these two sections are rigidly connected together by means of a slide pin 39 fitted into sockets at the ends of sections 29a and 29b and also by an elongated slide bolt 40 fitted into suitable keepers 41 secured to each of the pad bars 33 and 37. In addition, a sliding latch bolt 42 is provided on the end of section 29a for interconnecting with a keeper or socket 43 in the left hand door or arm rest.

The retainer bar 28 may be stored relatively close to the dashboard 11 by pushing the shock absorber cylinders 18 and 19 into their respective sockets 16 and 17 and then engaging the latch pin 23 with the forward edges 26 and 27 of the cylinders. In this position, the retainer bar is fairly close to the dashboard and is out of the way for storage.

In operation, the pins 23 are inserted through the openings 24 in the extensions 25 to thus locate the retainer bar close to the passengers and driver sitting on the front seat. For entrance and exit of passengers, the end section 29c can be pivotally swung forwardly about the hinge 35 by disconnecting the piston rod 21 from the bracket connection 30. Once the passengers are seated, the piston rod 21 is then reconnected and the slide bolt or slide latch 36 is connected with its keeper in the door.

The driver enters and exits by releasing the slide pin 39 and slide bolt 40 so that his section can be swung upwardly out of the way. Once seated, the slide pin 39 and the slide bolt 40 are engaged and the slide latch 41 is likewise engaged, thus rigidifying all three sections together.

In the event of an accident, the passengers are thrown forwardly against padding 34 and the loads are absorbed by the shock absorbers and by being transmitted through the sockets 16 and 17 to the rigid fire wall of the vehicle. Because of the substantial vertical height of the padded bar the load upon the passenger's body is materially reduced because it is widely dispersed and particularly, the curvature of the padding 34 tends to direct the loads to the hips or sides of the passenger, where the bone structure can take such loads. In addition, the passenger has a substantial freedom of movement upon the seat since the retainer bar would normally be spaced a short distance from his body rather than jammed up tight against it as in the case of a seat belt.

*Rear Retainer—FIGS. 5–6*

A similar retainer bar 28a is used for rear seat 45. The rear retainer bar is supported by a pair of end shock absorbers 50 and 51 and a central shock absorber 52, with the end shock absorbers being connected to the frame of the automobile, such as to the door posts 53 by means of extensions 54 connected to anchor brackets 55 secured to the door posts. The piston rods 57 are connected to releasable anchor brackets 56 secured to the opposite end sections. The central shock absorber 52 is connected to the center section by means of a piston rod 58 which is preferably bent, as shown in FIG. 6, and directed towards the floor of the vehicle where the cylinder 52 is connected by a floor bracket 59 to the floor 60. Releasing the piston rods 57 from their respective brackets 56 permits the end sections to be swung out of the way to permit the passengers to enter and exit.

*Utility Tray—FIGS. 7–8*

FIGS. 7 and 8 illustrate a utility tray supported upon the retainer bar. Sockets 61 are formed in the two passenger sections of the retainer bar 28 and receive L-shaped support rods 62 connected to the bottom of the utility tray 63 which has a peripheral edge padding 64 and a forward pad bar 65 covered with a heavy padding 66. The tray may be removed simply by lifting it upwardly to disengage the support rods from the sockets 61 and can be replaced by reinserting the bars into the sockets.

This invention may be further developed within the scope of the following attached claims. Accordingly, it is desired that the foregoing description be read as being merely illustrative of an operative embodiment of this invention and not in a strictly limiting sense.

I now claim:

1. An automobile passenger safety retainer for holding passengers upon the seat of an automobile comprising an elongated, wide, padded, horizontally arranged bar extending across the automobile for substantially the full width of the automobile seat and normally spaced a distance in front of the seat for abutting against passengers seated upon the seat, the bar being of substantial vertical height; the bar being connected to a portion of the automobile located in front of the seat by means of shock absorbers so that forwardly directed forces upon the bar will be absorbed by the shock absorbers as well as transmitted to the said automobile portion; said bar being formed in two sections connected end to end by a hinge for pivoting about a vertical axis and at least one of the shock absorber rods being releasably connected to one section and another shock absorber rod being connected to the other section.

2. An automobile passenger safety retainer for holding passengers upon the seat of an automobile comprising an elongated, wide, padded bar of substantial vertical height, horizontally arranged and extending substantially the full width of and spaced a distance in front of the automobile seat; the bar being formed of three sections hingedly connected together end to end for relative pivotal movement, each section being concavely curved relative to the seat back, and one end section being a driver retainer section, the center and other end sections being passenger retainer sections; the passenger retainer sections being hinged for relative pivoting about a vertical axis and the driver section being hinged to the center section for relative pivoting about a horizontal axis; the passenger sections each being connected to a portion of the automobile by means of forwardly extending shock absorbers, with the shock absorbers connected to the end passenger section being releasably connected to its section, the driver's section being releasably locked to the center section by a releasable locking means to restrain relative pivoting between these two sections.

3. A construction as defined in claim 2 and including a horizontally arranged tray located above the two passenger sections and secured thereto by means of support rods connected to the bottom of the tray and fitted within vertically axised sockets formed in each of said two sections.

References Cited in the file of this patent
UNITED STATES PATENTS

| | | |
|---|---|---|
| 2,322,755 | Voorhies | June 29, 1943 |
| 2,717,162 | Walters | Sept. 6, 1955 |
| 2,749,143 | Chika | June 5, 1956 |
| 2,781,203 | Kurilenko | Feb. 12, 1957 |
| 2,801,866 | Naslund | Aug. 6, 1957 |
| 2,919,140 | West | Dec. 29, 1959 |

FOREIGN PATENTS

| | | |
|---|---|---|
| 851,307 | Germany | Oct. 2, 1952 |
| 848,310 | Germany | Jan. 19, 1953 |
| 1,065,793 | France | Jan. 13, 1954 |